US 6,440,589 B1

(12) United States Patent
Fullerton et al.

(10) Patent No.: US 6,440,589 B1
(45) Date of Patent: Aug. 27, 2002

(54) MAGNETIC MEDIA WITH FERROMAGNETIC OVERLAY MATERIALS FOR IMPROVED THERMAL STABILITY

(75) Inventors: Eric Edward Fullerton, San Jose; David Thomas Margulies, Gilroy; Ernesto Esteban Marinero, Saratoga; Manfred Ernst Schabes, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,606

(22) Filed: Jun. 2, 1999

(51) Int. Cl.[7] .............................. G11B 5/66; G11B 5/70; B05D 5/12
(52) U.S. Cl. .............................. 428/694 TM; 428/336; 428/900; 428/694 TC; 428/212; 427/131; 427/132
(58) Field of Search .............................. 428/65.3, 65.5, 428/65.6, 65.7, 336, 694 TS, 694 TC, 694 TM, 694 ST, 900, 212, 694 BM; 427/131, 132

(56) References Cited

U.S. PATENT DOCUMENTS

| | | | |
|---|---|---|---|
| 4,794,047 A | * 12/1988 | Funamoto | 428/408 |
| 5,057,380 A | * 10/1991 | Hayashi et al. | 428/692 |
| 5,432,012 A | * 7/1995 | Lal et al. | 428/610 |
| 5,658,659 A | * 8/1997 | Chen et al. | 428/332 |
| 5,763,071 A | * 6/1998 | Chen et al. | 428/332 |
| 5,840,394 A | * 11/1998 | Ranjan et al. | 428/65.3 |
| 6,129,981 A | * 10/2000 | Okuyama et al. | 428/332 |

OTHER PUBLICATIONS

Chen, J. et al., Comparison of time–decay of read–back signals in keepered and non–keepered Media, IEEE Trans. On Mag., 34(4), pp. 1624–1626, 1998.

* cited by examiner

*Primary Examiner*—Paul Thibodeau
*Assistant Examiner*—Holly C. Rickman
(74) *Attorney, Agent, or Firm*—Lumen Intellectual Property Services, Inc.

(57) ABSTRACT

A magnetic recording disk has a magnetic recording layer that includes a ferromagnetic host layer and a ferromagnetic overlay deposited directly on the host layer with an effective overlay thickness in the range of 1–40 Angstroms. The ferromagnetic material used in the overlay contains Co, Fe and/or Ni and has a magnetic moment significantly greater than that of the material in the ferromagnetic host layer. The ferromagnetic overlays improve the thermal stability of superparamagnetic grains contained within the host layers by magnetically coupling the grains through bridging. The enhanced thermal stability of the media allows for the use of thinner ferromagnetic host layers, and leads to lower remanent magnetization-thickness product ($M_r t$) values and higher recording densities.

21 Claims, 5 Drawing Sheets

| R O W | Co(A) | Mrt | Hc | S* | SNR |
|---|---|---|---|---|---|
| 1 | 0 | .3 | 3600 | .68 | 31.7 |
| 2 | 3 | .31 | 3700 | .80 | 32.74 |
| 3 | 6 | .33 | 3340 | .88 | 31.7 |

MAGNETIC MEDIA WITH FERROMAGNETIC OVERLAY MATERIALS FOR IMPROVED THERMAL STABILITY

FIELD OF THE INVENTION

This invention relates generally to magnetic layered structures for use in magnetic recording media, particularly magnetic recording disks.

BACKGROUND

Conventional magnetic recording disks have a magnetic recording layer, typically of a ferromagnetic alloy, such as a cobalt (Co) alloy, that is sputter deposited as a continuous thin film having grains of the crystalline magnetic material. It is well known that to achieve high density recording in magnetic recording disks it is necessary to decrease the grain size, increase the coercivity ($H_c$), and reduce the remanent magnetization-thickness product ($M_r t$) of the magnetic recording layer. Therefore, most attempts to increase the magnetic recording density of magnetic media have focused on these three parameters by altering the composition and microstructure of the magnetic material in the magnetic layer or by reducing the magnetic layer thickness to achieve low $M_r t$. Unfortunately, very thin magnetic recording layers with small grains can become thermally unstable, wherein the magnetic moments of the small grains can spontaneously switch their magnetization direction, resulting in loss of the recorded data. This is of concern, especially at the elevated operating temperatures of the disk drive. Thermally unstable grains, at sufficiently small grain sizes, are generally referred to as superparamagnetic grains.

These superparamagnetic grains represent a serious obstacle to further increases in magnetic recording densities. This limitation of conventional media is evident by the fact that a reduction in grain volume by a mere factor of one half, for instance, may change the thermal stability from being on the order of several years to less than a minute.

Conventional media may show amplitude loss, noise increase, increased data error rate, loss of resolution, etc., in short, a general loss of magnetic recording performance due to thermally driven demagnetization processes even before catastrophic and rapid thermal demagnetization sets in at the superparamagnetic limit. This slower but steady magnetization decay can be characterized by a number of experimental measurement methods, including magnetic "viscosity" (magnetization decay rate) measurements. The conventional magnetic recording media can exhibit significant magnetization decay rates which impose serious limitations on the magnetic recording densities that can be achieved.

The conventional mechanism to stabilize thermally activated magnetization processes is by raising the magnetocrystalline anisotropy and coercivity of the media. This route is however subject to the constraint that the magnetic write head can produce only a maximum field magnitude which is limited by the magnetic moment density of the material of the pole pieces of the write head. The writeability of high-performance media is critical in order to increase the magnetic recording densities.

J. Chen et al. in *IEEE Trans. Mag.*, Vol. 34, no. 4, pp. 1624–1626, 1998; describes using "keeper layers" for thermally stabilizing the magnetic recording layers in the media. A chromium (Cr) break layer is laminated between the keeper layer and the magnetic layer. For example, a Cr break layer approximately 25 Angstroms thick is deposited on a magnetic layer prior to depositing a relatively thick (50 to 150 nm) keeper layer. The Cr break layer is used to control the growth of the keeper layer and to prevent exchange coupling between grains within the magnetic layer. Depositing such a thick magnetically soft keeper layer directly on a magnetic recording layer will cause strong magnetic inter-granular coupling in the magnetic layer and hinder its use for high density recording. The function of the keeper-layer/break layer construction is to reduce the demagnetization fields from adjacent magnetic transitions. Keeper layers are known to be a large source of recording noise. Furthermore, the keeper layer construction reported are 50–150 nm thick. It is preferred to have the total thickness of the layers and any overlays and protective overcoats making up the medium to be very thin to optimize the recording performance.

What is needed is a magnetic recording medium with a thin magnetic layer that has high coercivity, large coercivity squareness (S*), low remanent product thickness ($M_r t$), and that is thermally stable and writeable to be able to supporting very high recording densities. It is preferable that such a medium can be fabricated using conventional film deposition methods.

OBJECTS AND ADVANTAGES

Accordingly, it is a primary object of the present invention to provide magnetic recording media exhibiting enhanced thermal stability. Because the magnetic media of this invention exhibits improved thermal stability, thinner magnetic recording layers containing smaller grains can be used, resulting in higher magnetic data recording densities.

It is a second object of the invention to improve the recording characteristics of very thin magnetic layers by providing ferromagnetic overlays or capping layers deposited on these magnetic layers. The ferromagnetic overlays increase the effective volume of the small thermally unstable grains in the magnetic layers and thus increase thermal stability.

It is a third object of the present invention to provide magnetic recording media with improved writeability.

Lastly, it is an object of the present invention to provide magnetic media with sharp magnetic transitions, high S* and low $M_r t$.

SUMMARY OF THE INVENTION

The objects and advantages of the present invention are obtained by providing a magnetic media with a magnetic recording layer that includes a ferromagnetic "host" layer and a thin overlay or capping layer of ferromagnetic material deposited on the host layer. The ferromagnetic host layer is a granular layer with grains that are weakly coupled or uncoupled, wherein the grains are capable of independently changing magnetization directions in the presence of local magnetic fields generated by the magnetic write head. The ferromagnetic overlay enhances the thermal stability and writeability of the ferromagnetic material in the host layer, is substantially thinner than the host layer, and is exchange coupled to the host layer. Ferromagnetic "overlay" is meant to refer to a ferromagnetic material that is either a continuous layer of ferromagnetic material, a discontinuous layer in the form of a dispersion of islands or grains of ferromagnetic material, or a multiple phase layer containing islands or grains of a first ferromagnetic material separated by a second non-ferromagnetic material. Because the ferromagnetic overlay can be a discontinuous film or dispersion of material, it is convenient to refer to an "effective thickness" which is the thickness that would be attained with the same particle flux from the deposition apparatus for a film exhibiting continuous coverage. In addition, because multiple phase materials are also considered as ferromagnetic overlays, it is convenient to refer to effective concentrations of materials, which describe an average concentration of a material in the overlay. When referring to either a ferromagnetic overlay or a ferromagnetic host layer as a continuous layer the intent is to distinguish a continuous layer from a discontinuous layer or a dispersion of material, and is not intended to imply that the layer is a single phase material.

A magnetic medium of the present invention has at least one magnetic Co-based layer that is preferably 1 to 30 nm thick and that is deposited on a prepared substrate. The substrate is any suitable disk substrate, such as an aluminum disk blank coated with nickel phosphorus, glass coated with NiAl, silicon, ceramic, quartz, MgO and silicon-carbide. The substrates are covered with an underlayer in order to achieve the desired crystalline orientation of the subsequently deposited ferromagnetic host layer. Pure Cr is a typical underlayer, but underlayers may also include Cr alloys containing an element of Co, V, Ti and O. The choice of substrates and underlayers is dependent on the ferromagnetic host layer to be deposited and the intended application of the medium.

A ferromagnetic host layer is preferably a continuous magnetic recording layer, but may also be a patterned ferromagnetic host layer that is patterned by any of several methods known in the art to form discrete ferromagnetic and nonferromagnetic regions. In a preferred embodiment, a ferromagnetic host layer is a CoCr ternary or quarternary alloy with Co in the range of approximately 20–85 atomic percent (at %) and Cr up to approximately 30 at %. In a preferred embodiment the ferromagnetic host layer also contains Pt, Ta or Pd in the range of 1–20 at % and a segregating element of boron (B) in an effective concentration of 3–25 at %. Other segregating materials include oxides of Si and Co, and several transition metals, including Ti, Zr, Hf, Ag, Nb, W and Au, that weakly couple or do not couple magnetic grains. Materials used to form the ferromagnetic host layers have saturation magnetization ($M_s$) values between approximately 50 and 1000 emu/cm$^3$.

The thin ferromagnetic overlay or capping layer containing at least one element selected from Co, Fe and Ni is deposited on the ferromagnetic host layer. The capping layer is preferably a high moment ferromagnetic material with a saturation magnetization (Ms) value between approximately 50 and 1900 emu/cm$^3$. The ferromagnetic overlay is preferably a material that has a significantly higher magnetic moment (e.g., 1.5 times greater) than magnetic moment of the ferromagnetic host layer material. The ferromagnetic overlay is preferably a dispersion of ferromagnetic islands on the surface of the ferromagnetic host layer with an effective thickness of approximately 1–40 Angstroms. In an alternative embodiment, the ferromagnetic islands, also referred to as grains, contain elements of Pt and Pd in the range of approximately 1–75 at % or Cr in the range of 1–35 at %. In particular embodiments of the present invention the ferromagnetic overlay grains are separated by an amorphous secondary phase including CoO, SiO$_2$, or binary or ternary compounds of B.

The underlayers, ferromagnetic host layers and ferromagnetic overlays of the present invention are deposited by any number of methods including sputtering, ion-beam deposition and laser deposition. It is also desirable to deposit a protective overcoat, such as a conventional amorphous carbon overcoat, after depositing the ferromagnetic overlay to prevent oxidation and degradation of the overlay and ferromagnetic host layers. Magnetic media of the present invention have coercivity values ranging between 2–20 kOe.

In general, magnetic volume elements, which comprise multiple grains of the ferromagnetic alloy in the magnetic layer that together form a magnetic bit, contribute more to the readback signal the closer they are to the magnetic read head. In the present invention the magnetic material with the highest moment density, namely the material in the overlay, is placed in closest proximity to the read head. The moment density of Co, for instance, is nearly five times the moment density of the conventional ternary or quarternary Co alloy, which has a moment density of about 300 emu/cm$^3$. Thus a very thin layer of 0.5 nm of Co has nearly five times the moment density of a conventional ternary or quarternary Co alloy. Therefore a very thin layer of 0.5 nm of Co not only has an $M_rt$ equal to that of a layer of 2.5 nm of conventional Co alloy, it also places the source of the magnetic flux in much closer proximity to the read head. And because the high moment density overlay material is placed in closest proximity to the write head there is also an improvement in writeability since during writing the field from the write head is strongest at the surface closest to the head. Furthermore, the magnetic torques that are exerted by the applied field from the write head are amplified by the increased moment density of the ferromagnetic overlay. The present invention therefore offers improvements in writing by combining the strongest write field magnitudes with the largest magnetic torques at the surface of the magnetic recording layer in the medium.

For a fuller understanding of the nature and advantages of the present invention, reference should be made to the following detailed description taken together with the accompanying figures.

DESCRIPTION OF THE PREFERRED EMBODIMENTS

Although the following detailed description contains many specifics for the purposes of illustration, one of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
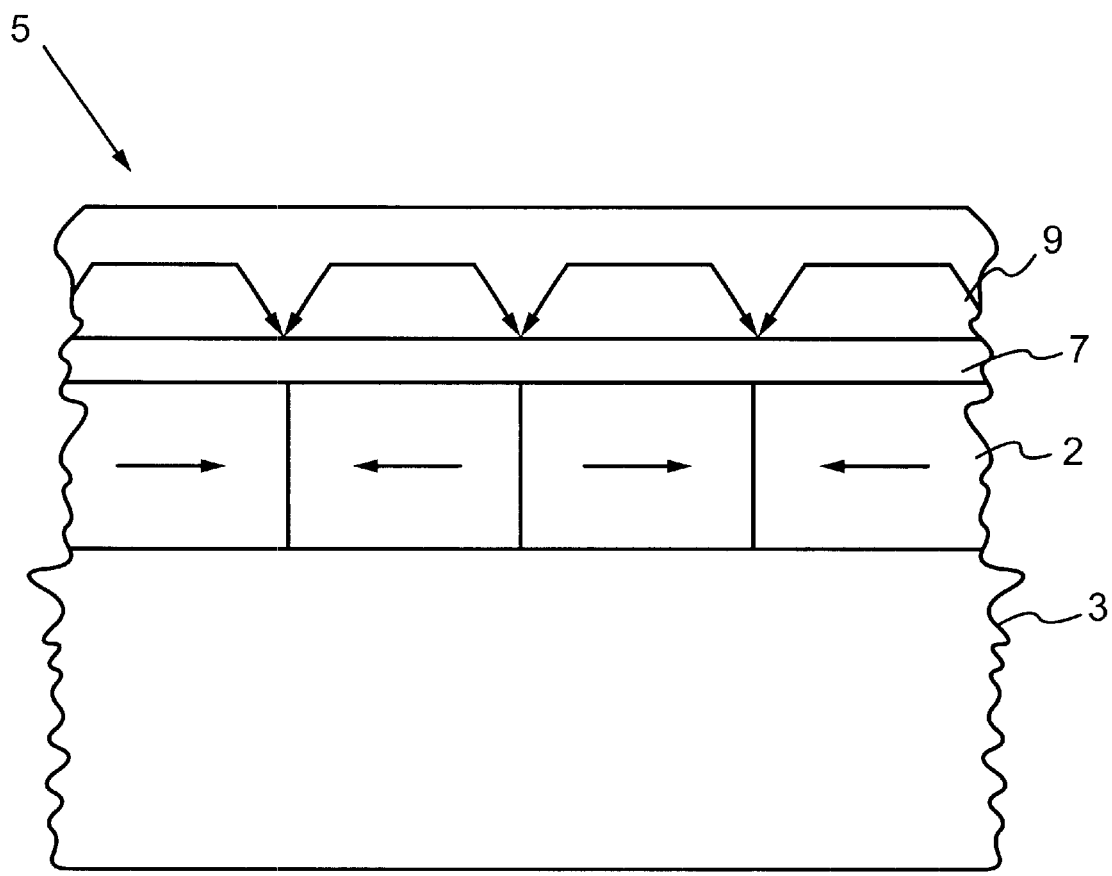
FIG. 1 illustrates a cross-sectional view of a magnetic disk made according to the prior art with a break layer and a soft keeper layer deposited on the magnetic recording layer.

FIG. 1 is a cross sectional view of a prior art magnetic medium 5 with a keeper layer 9. A magnetic recording layer 2 is deposited on a substrate 3. On top of the magnetic recording layer 2, a thin Cr break layer 7 is deposited to a thickness of approximately 25 Angstroms. On top of the break layer 7, a keeper layer 9 is deposited. The break layer 7 is deposited on the magnetic recording layer 2 to prevent or reduce inter-granular coupling in the magnetic layer 2. The magnetically soft keeper layer 9 reduces the demagnetization field that arises from the magnetic transitions recorded in the magnetic layer 2.

Figure 2:
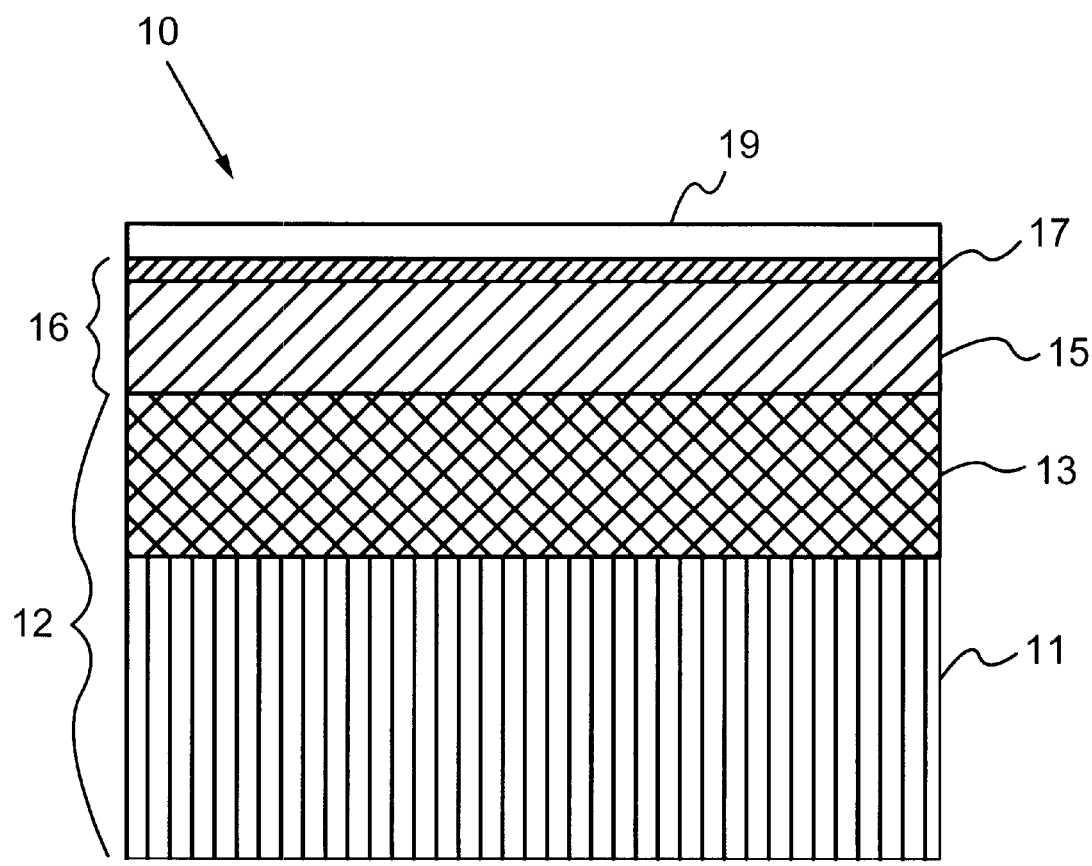
FIG. 2 is cross-sectional representation of a magnetic recording disk made in accordance with the present invention.

FIG. 2 shows a cross-sectional view of a magnetic recording disk 10 made in accordance with the preferred embodiment of the present invention. The disk 10 uses a substrate 11, which is preferably a substrate of aluminum coated with nickel phosphorus, but can also be a glass, silicon, ceramic quartz, MgO or silicon-carbide substrate. A Cr-based underlayer 13 is deposited on substrate 11. A ferromagnetic host layer 15 is preferably a continuous ferromagnetic layer deposited on underlayer 13. The ferromagnetic host layer may also be one or more of the ferromagnetic films used in a magnetic recording disk that has a laminated type magnetic recording layer, as described, for example, in IBM's U.S. Pat. No. 5,051,288. The underlayer 13 is deposited on the substrate 11 to facilitate the subsequent deposition and growth of the host layer 15. It is well known that depositing specific Cr-based underlayers can enhance the growth processes of subsequently deposited ferromagnetic layers. Pure Cr is typically used as an underlayer, but underlayers with an element of Co, V, Ti and O may also be used in the present invention.

Ferromagnetic host layer 15 is a CoCr alloy 1–30 nm thick that has a saturation magnetization value ($M_s$) between 50–1000 emu/cm$^3$. In the preferred embodiment, the ferromagnetic host layer 15 also contains an element of Pd, Ta or Pt in the range of 1"25 at % and may also contain B with an effective concentration in the range of 1–20 at % to act as a segregating material for the CoCr alloy grains. Other segregating materials include CoO and SiO$_2$.

A thin ferromagnetic overlay 17 containing at least one element of Co, Fe and Ni and with an effective thickness between 1–40 Angstroms is deposited on the ferromagnetic host layer 15. The overlay material has a $M_s$ value between 50–1900 emu/cm$^3$. The overlay material has a Ms value that is substantially higher than that of the ferromagnetic host layer material. In an alternative embodiment of the present invention the ferromagnetic overlay also contains an element of Pt or Pd in the range of 1–75 at %. The ferromagnetic overlay may also contain Cr in a range of approximately 1–35 at %. The ferromagnetic overlay may also be a dispersion of islands or grains of ferromagnetic material that are segregated by a nonferromagnetic segregating material. Preferred segregating materials that may be used with the ferromagnetic overlays of this invention include B, CoO and SiO$_2$. It is beneficial to deposit a conventional carbon overcoat layer 19 after depositing the ferromagnetic overlay to prevent surface oxidation of the underlying layers.

Figure 3:
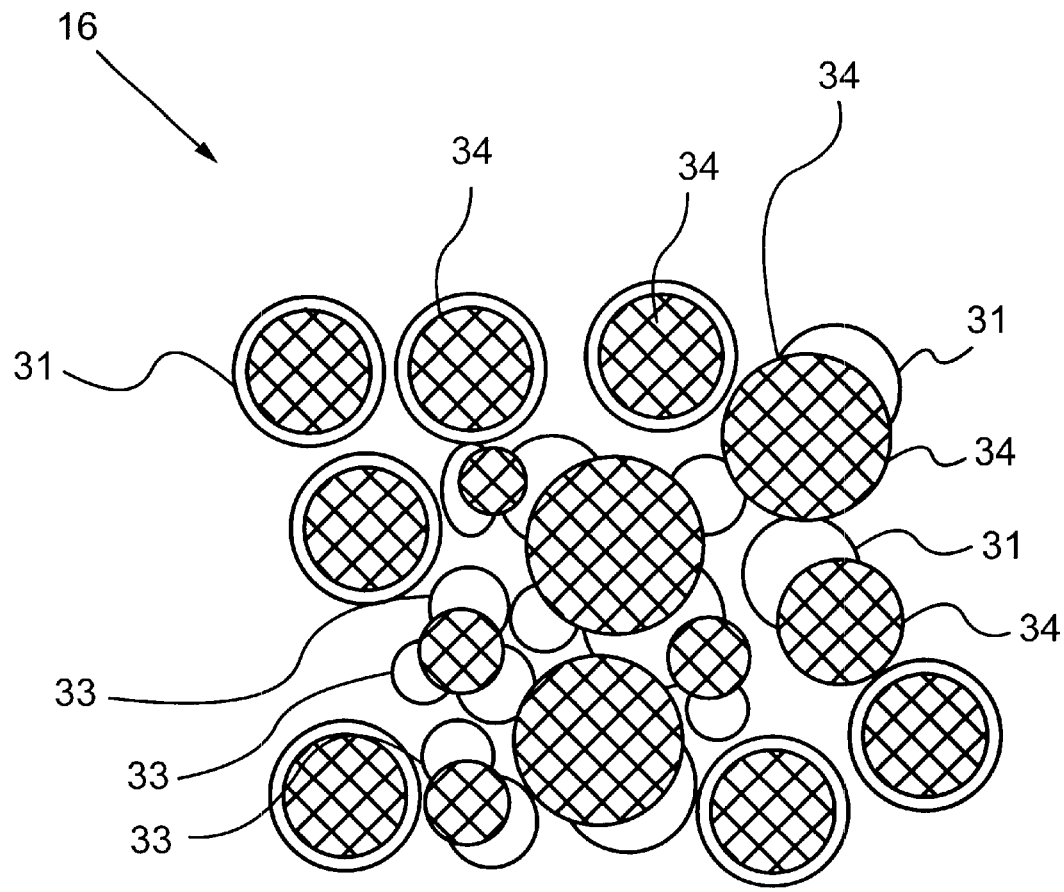
FIG. 3 is top view of a magnetic disk of the present invention illustrating partial coverage of a ferromagnetic host layer by the ferromagnetic overlay material.

FIG. 3 illustrates a top view of the magnetic disk of the present invention showing partial coverage of the ferromagnetic host layer by the ferromagnetic capping layer or overlay. The clear circles represent grains 31 and 33 or collections of grains of the ferromagnetic host layer and the hatched circles represent the islands or grains 34 of the ferromagnetic overlay material deposited on the surface of the ferromagnetic host material. The larger clear circles represent larger grains 31 that have sufficient volume to be thermally stable, while the smaller clear circles represent smaller grains 33 that are thermally unstable in the absence of the ferromagnetic overlay material. By providing ferromagnetic overlay grains 34 on the surface of the ferromagnetic host layer grains 31 and 33, the smaller grains 33 are magnetically coupled through the overlayer grains 34 that bridge the host layer grains together, while the larger thermally stable grains 31 remain largely uncoupled to other large grains. Thus the effective magnetic volumes of the small grains 33 are increased, which thereby improves their thermal stability.

Figure 4:
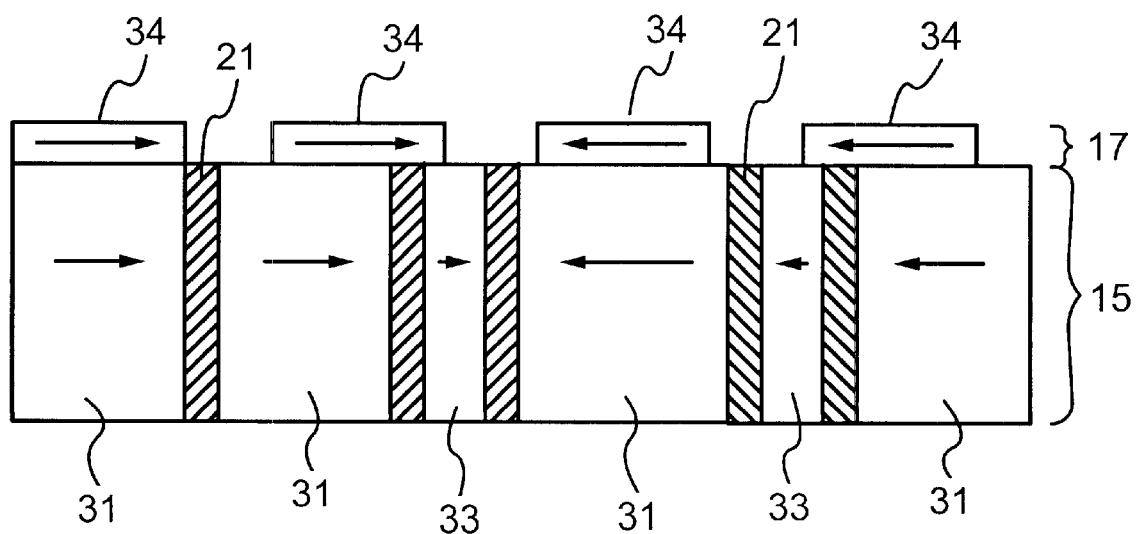
FIG. 4 is a sectional view of a portion of the disk shown in FIG. 3 representing the coupling of small grains of the host ferromagnetic layer by islands of ferromagnetic overlay material, and further representing two magnetic bits.

FIG. 4 is a sectional view through a portion of the ferromagnetic host layer and capping layer depicted in FIG. 3 and illustrates the microstructure of the magnetic recording layer that comprises the ferromagnetic host layer 15 and the capping layer 17. The ferromagnetic host layer 15 contains grains 31, 33 or groups of grains that are physically separated, preferably by a nonferromagnetic segregating material 21. Segregation of the grains is accomplished by the inclusion of an element or elements during deposition of the ferromagnetic host layer 15. The preferred segregating material is B, but SiO$_2$, CoO, and transition metals of Ti, Zr, Hf, Ag, Nb, W and Au, which do not strongly couple magnetic grains, are also useful as grain segregating materials. In the preferred embodiment the ferromagnetic host layer 15 is formed of CoPtCrB, with some of the added B and Cr serving as segregating material 21. The segregating material used is preferably incorporated into the ferromagnetic host layer with an effective host layer concentration in a range of 1–20 at %. The segregating material 21 acts as an insulator to reduce inter-granular coupling and allows each grain to act independently of one another. FIG. 4 also illustrates how grains 34 of the capping layer 17 magnetically couple the small grains 33 with adjacent grains 31, resulting in an increase in their effective magnetic volume. A preferred material for an overlay that includes a nonferromagnetic material that results in segregation is CoCr, which can be deposited over the host layer 15 by sputter deposition from a CoCr target. In such an embodiment where the ferromagnetic CoCr overlay has an effective thickness sufficient to form as a continuous film, unlike the discontinuous overlay 17 depicted in FIG. 4, it is believed that the Co-rich islands or regions of grains 34 would be separated by Cr-rich regions between the grains 34.

In FIG. 4, two magnetic bits are represented by the arrows, with the arrows facing right representing magnetization of those grains in one direction and the arrows facing left representing magnetization of those grains in the opposite direction. In the preferred embodiment of the invention the magnetic moment of the material forming the ferromagnetic overlay is equal to or greater than 1.5 times the magnetic moment of the material in the ferromagnetic host layer.

Figures 5, 6:
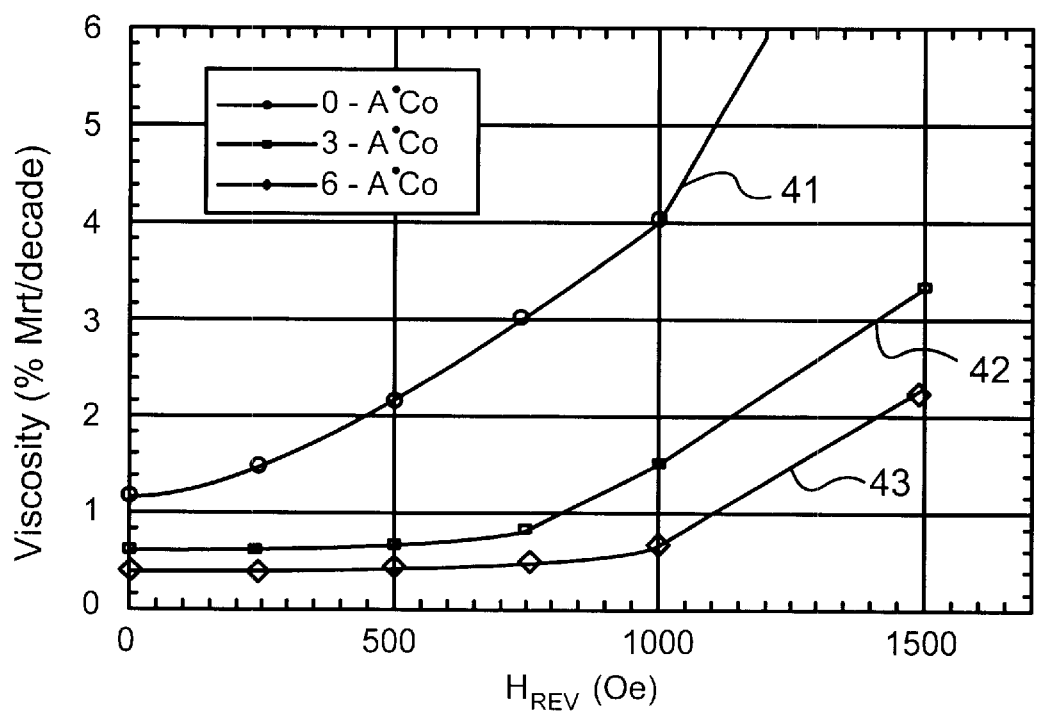
FIG. 5 is a Table listing magnetic data for three magnetic structures made with CoPtCr alloy ferromagnetic host layers and different thicknesses of ferromagnetic Co overlay material.
FIG. 6 are graphs of magnetization decay rate versus applied reverse field for the magnetic structures whose data is listed in the Table of FIG. 5.

The table in FIG. 5 lists the magnetic properties for three magnetic structures. Row 1 lists the magnetic data for a magnetic structure with a CoPtCrB ferromagnetic layer without a ferromagnetic overlay, row 2 lists the magnetic data for a structure made with a CoPtCrB host layer and a Co ferromagnetic overlay having an effective thickness of 3 Angstroms, and row 3 lists the magnetic data for a second structure with a CoPtCrB ferromagnetic host layer and a Co ferromagnetic overlay having an effective thickness of 6 Angstroms. Both of the samples in rows 2 and 3 exhibit improved coercivity squareness (S*) and the sample with a Co ferromagnetic overlay of 3 Angstroms exhibits an improved SNR.

FIG. 6 illustrates the most profound improvement observed for samples made according to the present invention, namely improved thermal stability. In FIG. 6 the magnetization decay rates (also called "viscosity") as a function of applied reverse field are plotted for the three samples of the table of FIG. 5. The line 41 is the magnetization decay curve for the sample prepared without a ferromagnetic overlay, line 42 is the magnetization decay curve for the sample with a Co ferromagnetic overlay having an effective thickness of 3 Angstroms, and line 43 is the magnetization decay curve for the sample with a Co ferromagnetic overlay having an effective thickness of 6 Angstroms. These demagnetization curves show a clear improvement in thermal stability for samples with a Co overlay that continues to improve with ferromagnetic overlay thickness.

Figure 7:
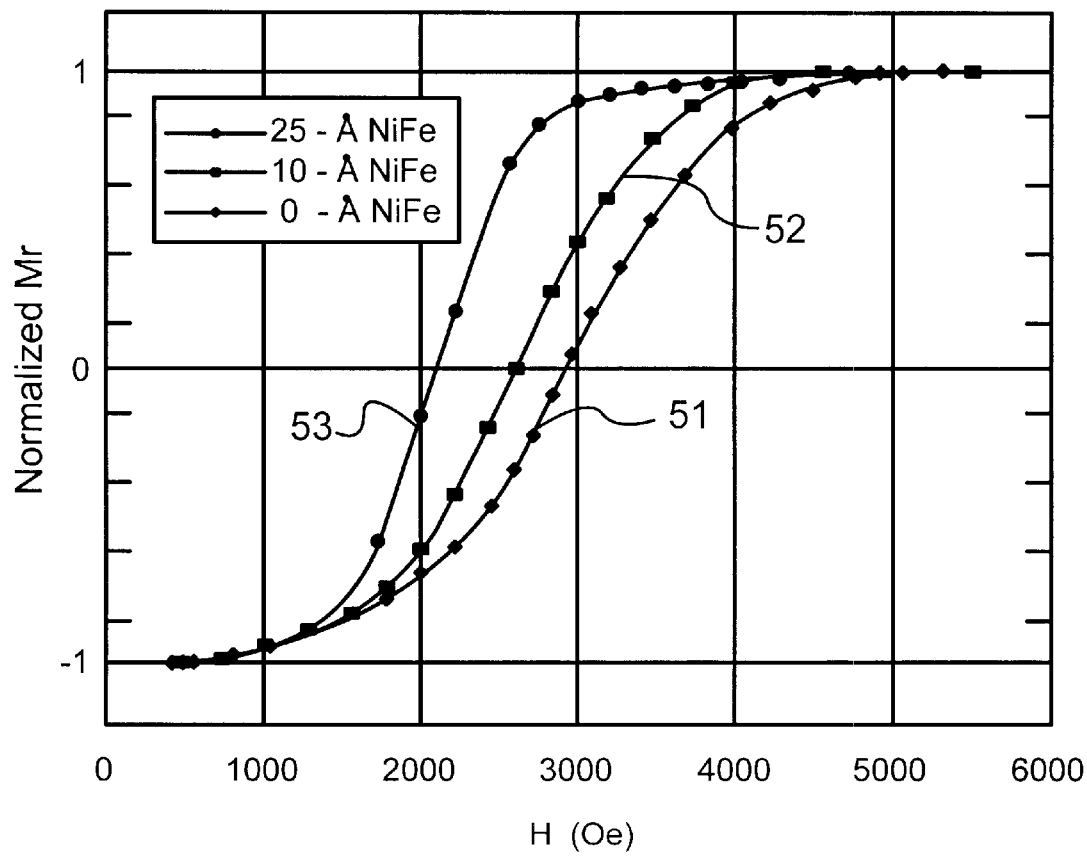
FIG. 7 are graphs of the remanent magnetization versus applied field for magnetic structures with CoPtCrB ferromagnetic host layers and various thicknesses of permalloy (NiFe) ferromagnetic overlays.

FIG. 7 illustrates the effect of using permalloy (NiFe) ferromagnetic overlays to achieve improved thermal stability and magnetic transition squareness. FIG. 7 is a plot of the remanent magnetization $M_r$ versus applied field for three magnetic structures containing CoPtCrB alloy ferromagnetic host layers. A first sample (line 51) has no ferromagnetic overlay, a second sample (line 52) has a NiFe ferromagnetic overlay with an effective thickness of 10 Angstroms on the CoPtCrB alloy ferromagnetic host layer, and a third sample (line 53) has a NiFe ferromagnetic overlay with an effective thickness of 25 Angstroms on the CoPtCrB alloy ferromagnetic host layer. The curves illustrate a decrease in remanent magnetization $M_r$ and improved coercivity squareness S* with the inclusion of NiFe ferromagnetic overlays. Furthermore, continued reduction of $H_c$, and increase in S* are observed with increasing thicknesses of NiFe ferromagnetic overlays having an effective thickness up to 25 Angstroms. Note that S* correlates to the slope of the M-H curve by the following relationship:

$$dM_r/dH_{-H=Hc} = M_r/(H_c(1-S^*))$$

In contrast to the structures with the Co overlays in the table of FIG. 5, the 25 Angstroms thick NiFe overlay whose data is shown in line 53 of FIG. 7 is a continuous layer that covers the entirety of the underlying host ferromagnetic layer.

Figure 8:
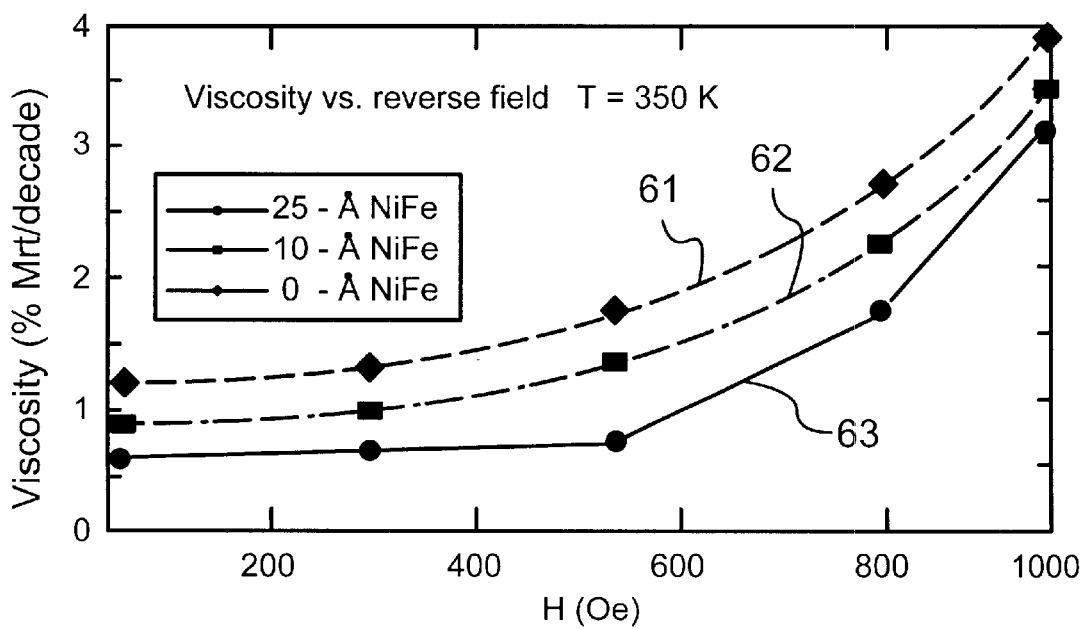
FIG. 8 are graphs of magnetization decay rate versus applied reverse field for the same magnetic structures whose data is plotted in FIG. 7.

In FIG. 8 the magnetization decay curves for the samples described with respect to FIG. 7 are plotted. The line 61 corresponds to the sample without a NiFe ferromagnetic overlay, line 62 corresponds to the sample with a NiFe ferromagnetic overlay having an effective thickness of 10 Angstroms and line 63 corresponds to the sample with a NiFe ferromagnetic overlay having an effective thickness of 25 Angstroms. The samples with the NiFe ferromagnetic overlays exhibit improved thermal stability over the sample without a ferromagnetic capping layer.

While the present invention has been particularly shown and described with reference to the preferred embodiments, it will be understood by those skilled in the art that various changes in form and detail may be made without departing from the spirit and scope of the invention. For example, while in the preferred embodiment of the invention the ferromagnetic host layer is a continuous granular magnetic layer, the capping overlays described above can also be deposited on patterned magnetic layers that have been patterned to provide discrete magnetic bit regions or discrete tracks.

What is claimed is:

1. A magnetic recording medium comprising:
   a) a substrate;
   b) an underlayer on the substrate;
   c) a granular ferromagnetic Co alloy host layer formed on said underlayer and having a thickness in the range of approximately 1 to 30 nanometers; and
   d) a ferromagnetic overlay formed on and in contact with said granular ferromagnetic Co alloy host layer and comprising at least one element selected from the group consisting of Co, Fe and Ni, said ferromagnetic overlay having an effective thickness in the range of approximately 1 to 40 Angstroms and a magnetic moment density at least 1.5 times greater than the magnetic moment density of said granular ferromagnetic Co alloy host layer.

2. The recording medium of claim 1 wherein said ferromagnetic overlay further comprises an element selected from the group consisting of Pt and Pd.

3. The recording medium of claim 1 wherein said ferromagnetic overlay further comprises Cr.

4. The recording medium of claim 1 wherein said ferromagnetic overlay includes grains of ferromagnetic material segregated by segregating material selected from the group consisting of CoO, $SiO_2$, and B.

5. The recording medium of claim 1 wherein said granular ferromagnetic Co alloy host layer includes Cr.

6. The recording medium of claim 5 wherein said granular ferromagnetic Co alloy host layer further comprises an element selected from the group consisting of Pd, Ta and Pt.

7. The recording medium of claim 5 wherein said granular ferromagnetic Co alloy host layer further includes a segregating material selected from the group consisting of CoO, $SiO_2$, B, Ti, Zr, Hf, Ag, Nb, W and Au.

8. A magnetic recording disk comprising:
   a) a disk substrate;
   b) an underlayer comprising Cr deposited on said disk substrate;
   c) a granular ferromagnetic host layer comprising a Co alloy comprising $Co_xCr_y$ wherein 20<x<85 and 0<y<30 atomic percent, and 40<(x+y)<90; and
   d) a ferromagnetic overlay comprising at least one element selected from the group consisting of $Co_u$, $Fe_v$ and $Ni_w$, wherein 0<u<100, 0<v<100 and 0<w<100 atomic percent, and 50<(u+v+w)<100 atomic percent, wherein said ferromagnetic overlay has an effective thickness of 1.0 to 40 Angstroms and is in contact with said host layer, and wherein said ferromagnetic host layer is a discontinuous layer.

9. The recording disk of claim 8 wherein said disk substrate is selected from the group consisting of aluminum coated with nickel phosphorus, glass coated with NiAl, silicon, ceramic quartz, MgO and silicon-carbide.

10. The recording disk of claim 8 wherein said underlayer further comprises an element selected from the group consisting of Co, V, Ti and O.

11. The recording disk of claim 8 wherein said ferromagnetic host layer is in the range of approximately 1 to 30 nanometers thick.

12. The recording disk of claim 8 wherein said ferromagnetic host layer further comprises an element selected from the group consisting of $Pd_z$, $Ta_z$, $Pt_z$ in a range of 1<z<20 atomic percent, and wherein 40<(x+y+Z)<100 atomic percent.

13. The recording disk of claim 8 wherein said ferromagnetic host layer include a segregating material selected from the group consisting of CoO, $SiO_2$, and B.

14. The recording disk of claim 8 wherein said granular ferromagnetic Co alloy host layer comprises ferromagnetic grains segregated by a transition metal segregating material comprising an element selected from the group consisting of Ti, Zr, Hf, Ag, Nb, W and Au, and wherein the effective host layer concentration of said transition metal segregating material is in a range of 1 to 20 atomic percent.

15. The recording disk of claim 8 wherein said overlay is a granular overlay comprising ferromagnetic grains including a segregating material selected from the group consisting of CoO, $SiO_2$ and B.

16. The recording disk of claim 8 wherein said overlay further comprises an element selected from the group consisting of $Pt_t$ and $Pd_t$ in the range of $1<t<75$ atomic percent, and wherein $75<(t+u+v+w)<100$ atomic percent.

17. The recording disk of claim 15 wherein said grains of said ferromagnetic overlay further comprise $Cr_s$ in the range of $1<s<25$ atomic percent, and wherein $75<(s+u+v+w)<100$ atomic percent.

18. The recording disk of claim 8 wherein the coercivity of said disk is between 2 and 20 kOe.

19. The recording disk of claim 8 wherein said underlayer is 200 to 1000 Angstroms thick.

20. The recording disk of claim 8 further comprising a protective carbon overcoat on said ferromagnetic overlay.

21. A method of making a magnetic recording medium, said method comprising the steps of:
   a) providing a substrate;
   b) depositing an underlayer on said substrate;
   c) depositing a granular ferromagnetic Co alloy host layer on said underlayer with a thickness in the range of approximately 1 to 30 nanometers; and
   d) depositing a ferromagnetic overlay on said granular ferromagnetic Co alloy host layer, said ferromagnetic overlay comprising at least one element selected from the group consisting of Co, Fe and Ni and having an effective thickness in the range of approximately 1 to 40 Angstroms and a magnetic moment density at least 1.5 times greater than the magnetic moment density of said granular ferromagnetic Co alloy host layer.

* * * * *